(12) United States Patent
Song et al.

(10) Patent No.: US 12,553,944 B2
(45) Date of Patent: Feb. 17, 2026

(54) BUILT-IN SELF TEST CIRCUIT FOR MEASURING PERFORMANCE OF CLOCK DATA RECOVERY AND SYSTEM-ON-CHIP INCLUDING THE SAME

(71) Applicant: SAMSUNG ELECTRONICS CO., LTD., Suwon-si (KR)

(72) Inventors: Hobin Song, Suwon-si (KR); Juyun Lee, Suwon-si (KR); Jiyoung Kim, Suwon-si (KR); Jaehyun Park, Suwon-si (KR); Sooeun Lee, Suwon-si (KR); Insik Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/597,499

(22) Filed: Mar. 6, 2024

(65) Prior Publication Data

US 2024/0302432 A1  Sep. 12, 2024

(30) Foreign Application Priority Data

Mar. 6, 2023 (KR) .................. 10-2023-0029444

(51) Int. Cl.
*G01R 31/3183* (2006.01)
*G01R 31/317* (2006.01)
(Continued)

(52) U.S. Cl.
CPC .......... *G01R 31/318328* (2013.01); *G01R 31/31724* (2013.01); *G01R 31/3187* (2013.01);
(Continued)

(58) Field of Classification Search
None
See application file for complete search history.

(56) References Cited

U.S. PATENT DOCUMENTS 7,539,916 B2  5/2009  Kanter et al.
7,743,288 B1  6/2010  Wang
(Continued)

FOREIGN PATENT DOCUMENTS

JP  2008151719 A  *  7/2008
JP  5074300 B2  11/2012
WO  2005-082106 A2  9/2005

OTHER PUBLICATIONS

Communication dated Jun. 19, 2024, issued by the European Patent Office in counterpart European Application No. 24161699.4.
(Continued)

*Primary Examiner* — Guerrier Merant
*Assistant Examiner* — Jack Kensington Barnett
(74) *Attorney, Agent, or Firm* — Sughrue Mion, PLLC (57) ABSTRACT

A system-on-chip includes a clock generation circuit configured to generate a reference clock of a first phase; a transmission circuit comprising a serializer configured to serialize data according to the reference clock of the first phase; a reception circuit comprising a clock data recovery (CDR) circuit configured to receive the serialized data and generate a first recovery clock and recovery data; and a Built In Self Test (BIST) circuit including a CDR performance monitoring circuit configured to generate a control signal provided to a delay controller configured to delay a clock signal by a preset phase difference, and the delay controller configured to delay the clock signal in response to the control signal by the preset phase difference and provide the delayed clock signal to the transmission circuit.

20 Claims, 10 Drawing Sheets

(51) Int. Cl.
*G01R 31/3187* (2006.01)
*H03K 5/00* (2006.01)
*H03K 5/13* (2014.01)
*H03L 7/08* (2006.01)
*H03L 7/081* (2006.01)

(52) U.S. Cl.
CPC ............. *H03K 5/13* (2013.01); *H03L 7/0807* (2013.01); *H03K 2005/00052* (2013.01); *H03L 7/0812* (2013.01)

(56) References Cited

U.S. PATENT DOCUMENTS

| | | | |
|---|---|---|---|
| 7,949,922 | B2 | 5/2011 | Ochi |
| 8,468,398 | B2 | 6/2013 | Jiang et al. |
| 8,949,680 | B2 | 2/2015 | Chae et al. |
| 8,966,332 | B2 | 2/2015 | Wall |
| 10,641,823 | B2 | 5/2020 | Lu et al. |
| 2008/0192814 | A1* | 8/2008 | Hafed .............. G01R 31/31901 375/224 |

OTHER PUBLICATIONS

Abdo et al., "Low-Power Built-in Jitter Injection Using Linearized Phase Interpolator," IEEE Transactions on Instrumentation and Measurement, vol. 69, No. 9, pp. 6112-6120, Sep. 2020, XP011805014.

Yoon et al., "A DC-to-12.5 GB/s 9.76 mW/GB/s All-Rate CDR With a Single LC VCO in 90 nm CMOS," IEEE Journal of Solid-State Circuits, vol. 52, No. 3, pp. 856-866, Mar. 2017, XP011641923.

Meixner et al., "External Loopback Testing Experiences with High Speed Serial Interfaces," 2008 IEEE International Test Conference, Oct. 2008, Total 11 pages.

Dicecco et al., "Test Considerations for Jitter Tolerance of Wireline Receivers," 2014 IEEE 27th Canadian Conference on Electrical and Computer Engineering (CCECE), May 2014, Total 6 pages.

* cited by examiner

BUILT-IN SELF TEST CIRCUIT FOR MEASURING PERFORMANCE OF CLOCK DATA RECOVERY AND SYSTEM-ON-CHIP INCLUDING THE SAME

CROSS-REFERENCE TO RELATED APPLICATION

This application is based on and claims priority under 35 U.S.C. § 119 to Korean Patent Application No. 10-2023-0029444, filed on Mar. 6, 2023, in the Korean Intellectual Property Office, the disclosure of which is incorporated by reference herein in its entirety.

BACKGROUND

1. Field

The embodiments of the present disclosure relate to a built-in self-test circuit, and more particularly, to a built-in self test circuit for measuring clock data recovery performance and a system-on-chip including the same.

2. Related Art

With the rapid development of recent technologies, the demand for high-speed data transmission is increasing significantly each day. For example, a serial communication method for transmitting data at a high speed is used by numerous applications. The serial communication method may be used in various applications, such as communication between components included in a system and movement of data inside an integrated circuit, as well as communication between independent devices through detachable ports. For example, the Peripheral Component Interconnect Express (PCIe) memory interface, a high-speed serial computer expansion bus standard for use with expansion cards, requires a speed of 16 Gbps per lane in Generation 4 and the MPHY interface requires a speed of about 24 Gbps per lane on the Gear5.

A Clock and Data Recovery (CDR) circuit that detects the phase of a clock embedded in serial data, generates recovery clocks from serial data, and generates recovery data from serial data using recovery clocks may be used in various devices and applications that transmit and receive data in a serial communication method. However, due to unacceptable dithering in a digital code of the CDR circuit, the performance of the CDR circuit may degrade creating a large amount of jitter in the recovery clock.

SUMMARY

The embodiments of the present disclosure provide a built-in self-test (BIST) circuit for measuring performance of a plurality of phase interpolation codes for a clock and data recovery (CDR) circuit by varying the phase of input data and a system-on-chip including the same.

According to one or more embodiments, a system-on-chip comprises: a clock generation circuit configured to generate a reference clock of a first phase; a transmission circuit comprising a serializer configured to serialize data according to the reference clock of the first phase; a reception circuit comprising a clock data recovery (CDR) circuit configured to receive the serialized data and generate a first recovery clock and recovery data; and a Built In Self Test (BIST) circuit comprising: a CDR performance monitoring circuit configured to generate a control signal provided to a delay controller configured to delay a clock signal by a preset phase difference, and the delay controller configured to delay the clock signal in response to the control signal by the preset phase difference and provide the delayed clock signal to the transmission circuit.

According to one or more embodiments, a system-on-chip comprising: a clock generation circuit configured to generate a first phase reference clock; a transmission circuit comprising a serializer configured to serialize data according to a reference clock of a first phase; a reception circuit comprising: a delay controller configured to receive the reference clock of the first phase and delay the received reference clock by a preset phase difference to generate a delay clock, and a Clock Data Recovery (CDR) circuit configured to receive the serialized data and generate a first recovery clock and recovery data; and a Built In Self Test (BIST) circuit comprising a CDR performance monitoring circuit configured to generate a control signal instructing generation of the delay clock.

According to one or more embodiments, an operating method of a Built In Self Test (BIST) circuit comprises a delay controller for phase delay of a clock and a clock data recovery (CDR) performance monitoring circuit, the method comprising: receiving a digital code from a CDR circuit outputting a recovery clock and recovery data based on input data; determining whether the received digital code is locked; and delaying a phase of the input data by a predefined phase difference by providing a control signal instructing a phase delay to the delay controller in response to the determination that the digital code is locked.

BRIEF DESCRIPTION OF DRAWINGS

Embodiments will be more clearly understood from the following detailed description taken in conjunction with the accompanying drawings in which.

DETAILED DESCRIPTION OF THE EMBODIMENTS

Hereinafter, embodiments will be described in detail with reference to the accompanying drawings.

The embodiments described herein are example embodiments, and thus, the disclosure is not limited thereto and may be realized in various other forms. It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Spatially relative terms, such as "over," "above," "on," "upper," "below," "under," "beneath," "lower," "left," "right," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

Figure 1:
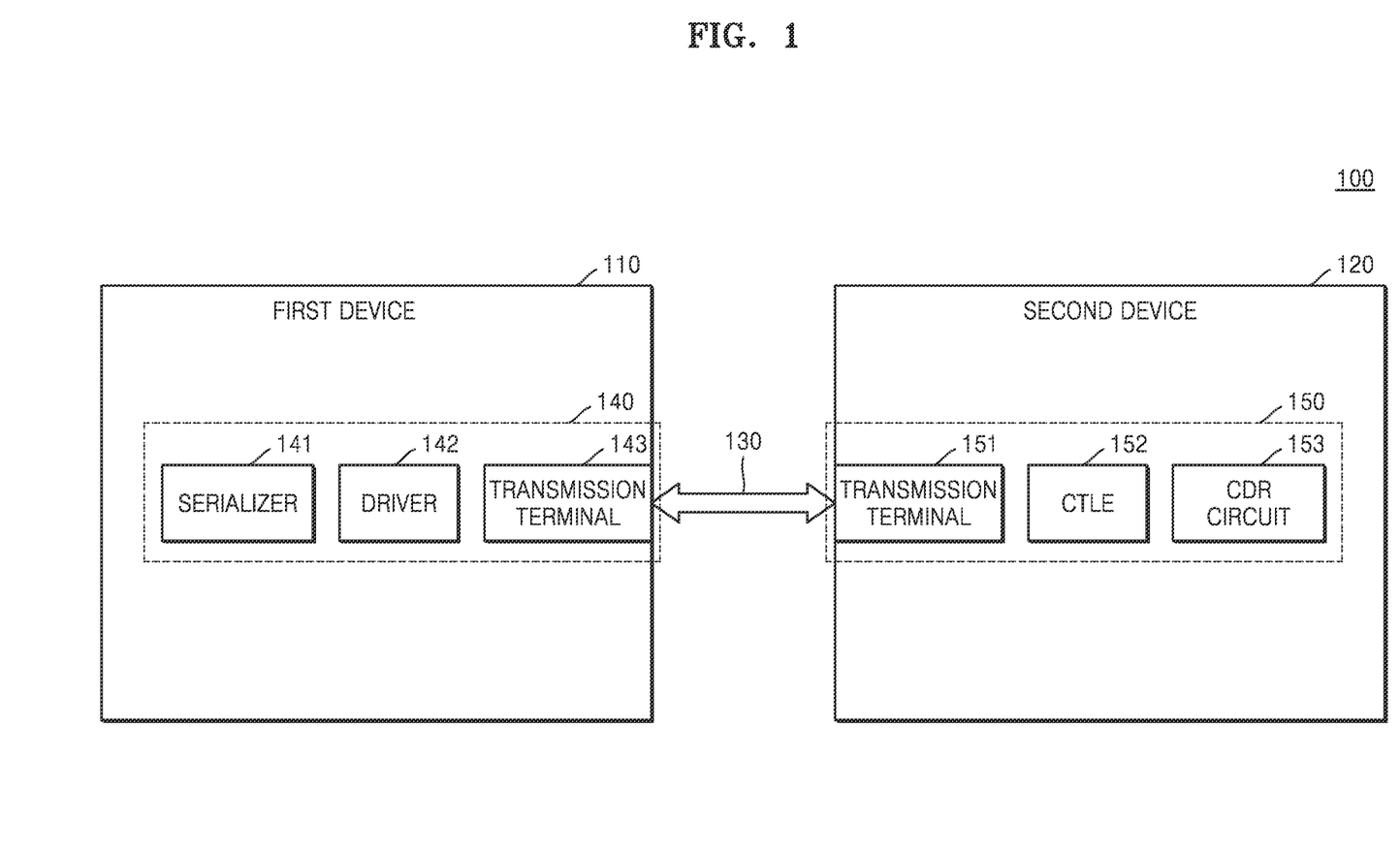
FIG. 1 is a block diagram illustrating a data transmission/reception system according to one or more embodiments.

FIG. 1 is a block diagram illustrating a data transmission/reception system according to one or more embodiments.

Referring to FIG. 1, a data transmission/reception system 100 may include a first device 110, a second device 120, and a transmission line 130.

The first device 110 may be a source device that transmits data to the second device 120, and may transmit data to the second device 120 via the transmission line 130 through a transmission terminal 143. In one or more embodiments, the first device 110 may transmit only data to the second device 120, separately encode data and transmit the encoded data, or transmit a clock signal together with the data.

According to one or more embodiments, the first device 110 may include a transmission circuit 140. The transmission circuit 140 may include a serializer 141 and a driver 142. The serializer 141 may be configured to serialize data to be transmitted to the second device 102, divide data according to a preset unit, and transmit the data as burst data according to a high-speed serial interface. If the length of the transmission line 130 is long or there is a lot of noise in a data channel through the transmission line 130 (e.g., channel quality is low), the driver 142 may amplify the serialized data and transmit the serialized data to the second device 120 via the transmission terminal 143.

The second device 102 may be a receiving device that receives data from the first device 110 through the transmission line 130 and the reception terminal 151. In one or more embodiments, the second device 120 may further include a decoder for decoding encoded data. In various embodiments, the first device 110 may be referred to as a transmitting device, a transmitting chip, a first chip, and the like and the second device 120 may be referred to as a receiving device, a receiving chip, a second chip, and the like.

According to one or more embodiments, the second device 120 may include a reception circuit 150. The reception circuit 150 may further include a Continuous Time Linear Equalizer (CTLE) 152 and a Clock and Data Recovery (CDR) circuit 153. The CTLE 152 may amplify high-frequency signals to compensate for attenuation of high-frequency signals in the serial data channel. The CTLE 152 may reduce inter-symbol interference by amplifying all frequency signals to have the same amplitude.

The CDR circuit 153 may receive an input data signal transmitted by the first device 110 in a serial communication method and may generate an output data signal from the input data signal. In one or more examples, the output data signal may be referred to as a recovery data signal. The input data signal may include a series of bits (e.g., a bit sequence). For example, the input data signal may include packets of m bits sequentially listed. The CDR circuit 153 may recognize serial data included in the input data signal by sampling a bit sequence included in the input data signal and may generate an output data signal including parallel data from the serial data.

According to one or more embodiments, the input data signal may include serial data as well as a clock. A data signal including serial data may be received from the first device 110 through the transmission line 130, and a clock signal may be separately received through the transmission line 130 and a separate clock line. In one or more embodiments, the first device 110 may include a clock in the data signal, and the second device 120 may recognize serial data by restoring the clock included in the data signal. The second device 120 may sample the bit sequence by restoring the clock including the fluctuation of the data signal, and accordingly, the data transmission rate may be improved. A clock included in the input data signal may be referred to as an embedded clock.

In various embodiments, a transmission line 130 may be referred to by various terms including a transmission channel and a data channel. In one or more examples, as shown in FIG. 1, the transmission line 130 is shown as a line for physical or electrical connection but is not limited thereto. According to various embodiments, the transmission line 130 may refer to a channel through which data is transmitted over the air.

Figure 2:
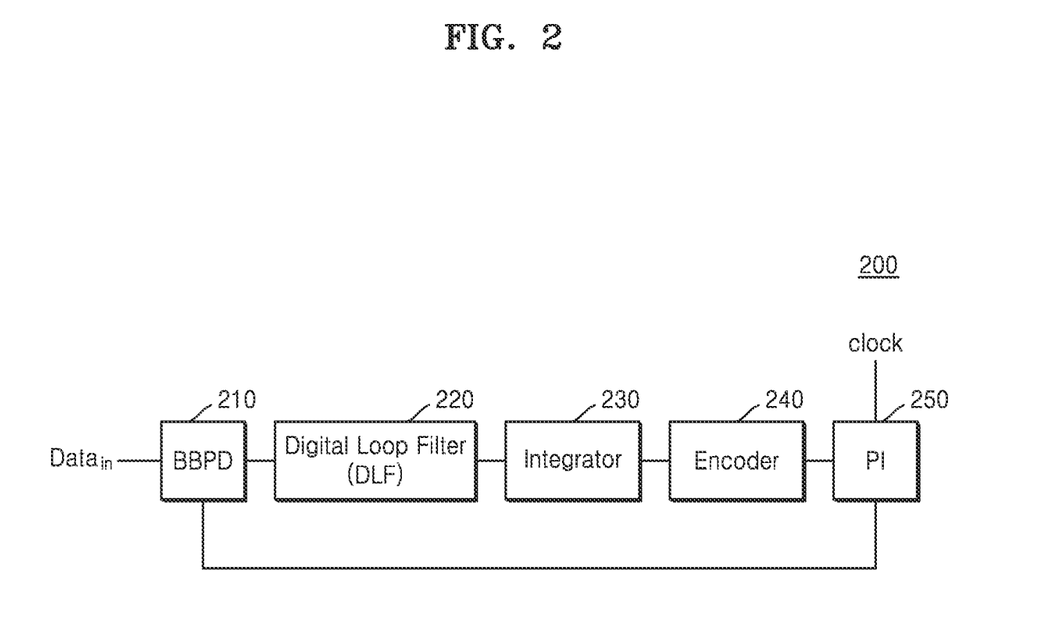
FIG. 2 is a block diagram illustrating a Clock and Data Recovery (CDR) circuit according to one or more embodiments.

FIG. 2 is a block diagram illustrating a CDR circuit 200 according to one or more embodiments.

Referring to FIG. 2, the CDR circuit 200 may include a bang bang phase detector (BBPD) 210, a digital loop filter 220, an integrator 230, an encoder 240, and a phase interpolator 250.

According to one or more embodiments, the BBPD 210 may receive a signal from a comparison sampler to determine whether data matches a clock or whether a clock precedes or follows data. The BBPD 210 may determine a clock locking or a leading or trailing clock based on changes in output values of the comparison sampler received during a predefined unit interval (UI). For example, the BBPD 210 may compare a clock output from the phase interpolator 250 with a transition of the input data (DATAin) to identify whether the phase of the clock is leading or lagging compared to the input data DATAin.

According to one or more embodiments, the digital loop filter 220 may receive the phase error signal β from the BBPD 210 and control the phase of the clock so that data and clock are locked (e.g., synchronized with each other). The digital loop filter 220 may determine that the phase error signal β is locked if the value of β is dithering (e.g., small variations) near "0". For example, the digital loop filter 220 may receive a lead value or a lag value of the clock phase received from the BBPD 210 and control the phase of the clock by instructing the phase interpolator 250 to change the digital code value when the received preceding value or the received following value satisfies a preset value.

According to one or more embodiments, the integrator 230 may perform a summation of the output and the input of the integrator 230 and provide the summed value to the integrator 230 as an input. For example, the integrator 230 may be referred to as an accumulator because the integrator 230 adds the input back to the output. According to one or more embodiments, the integrator 230 may be disposed between the digital loop filter 220 and the phase interpolator 250 such that the integrator receives the output of the digital loop filter 230 and provides an input that is propagated towards the phase interpolator 250. To enable phase tracking when a frequency offset exists between the input data DATA_IN and the clock, in the CDR circuit 200 using the phase interpolator 250, the integrator 230 may be disposed at the next stage of the digital loop filter 220 and in front of the phase interpolator 250.

According to one or more embodiments, the encoder 240 may encode a signal accumulated through the integrator 230. The output of the encoder 240 may be a digital code. For example, in the case of the CDR circuit 200 including the phase interpolator 250, the digital code may correspond to a Phase Interpolation (PI) code.

According to one or more embodiments, the phase interpolator 250 may receive the PI code from the encoder 240 and control the phase of an output clock. For example, the phase interpolator 250 may receive a source clock including a plurality of phase clocks from a phase locked loop (PLL). The phase interpolator 250 may generate a clock signal having a new phase by setting different weights among the plurality of phase clocks based on the PI code. According to various embodiments, the phase interpolator 250 may be implemented as a delay locked loop (DLL).

Figure 3:
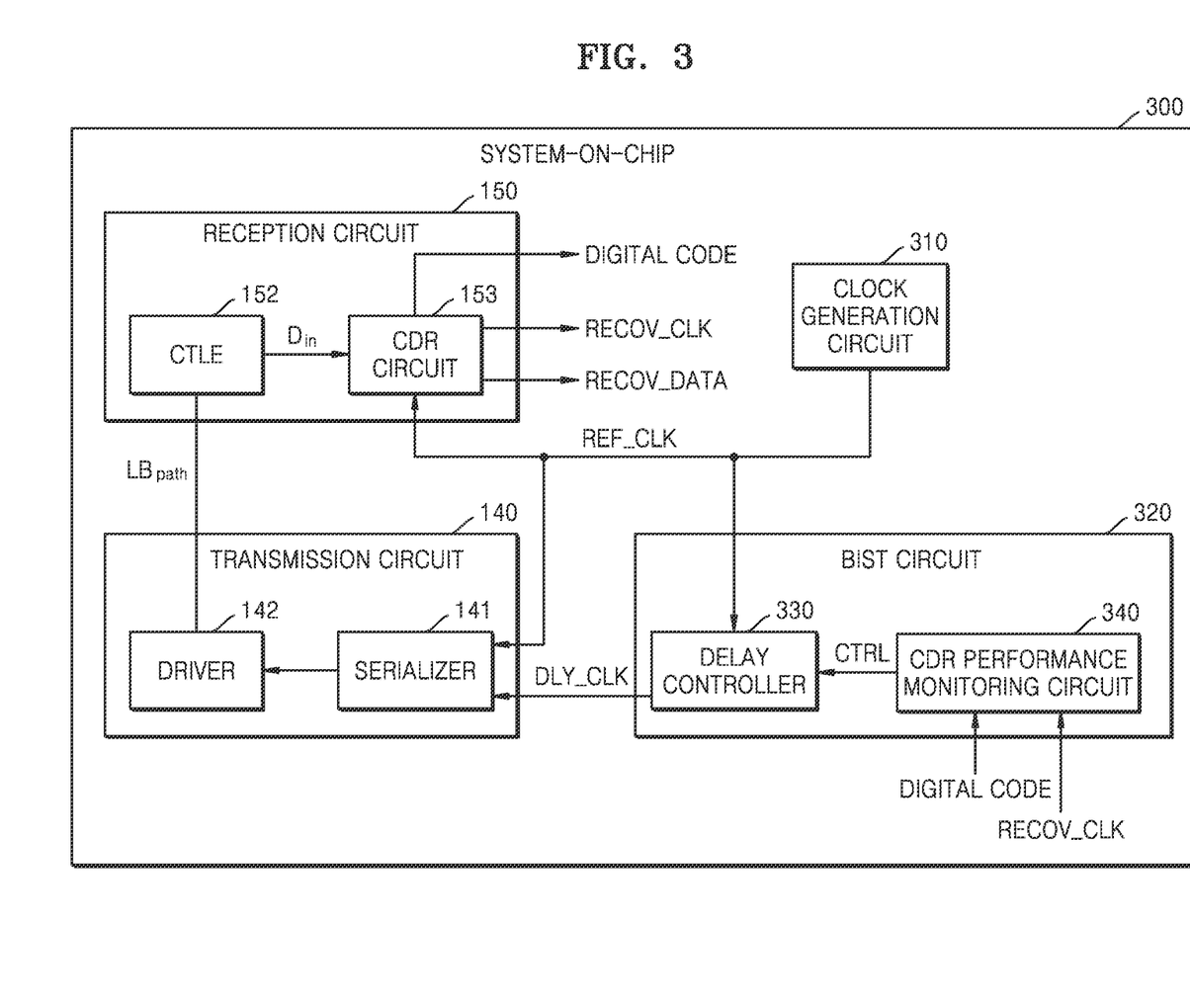
FIG. 3 is a block diagram of a system-on-chip according to one or more embodiments.

FIG. 3 is a block diagram of a system-on-chip 300 according to one or more embodiments.

Referring to FIG. 3, the system-on-chip 300 may include a transmission circuit 140, a reception circuit 150, a clock generation circuit 310, and a Built-In Self-Test (BIST) circuit 320. For example, referring to FIG. 1, the system-on-chip 300 may correspond to the first device 110 or the second device 120 of FIG. 1. The system-on-chip 300 may include both the transmission circuit 140 and the reception circuit 150.

The clock generation circuit 310 may generate a reference clock REF_CLK. The clock generation circuit 310 may provide the generated reference clock REF_CLK to the CDR circuit 153. The CDR circuit 153 may output a recovery clock RECOV_CLK and recovery data RECOV_DATA by comparing the reference clock REF_CLK provided from the clock generation circuit 310 with input data Din. The CDR circuit 153 may provide a digital code to the BIST circuit 320. The digital code may be a PI code for phase control of a phase interpolator included in the CDR circuit 153.

The BIST circuit 320 may be a built-in test circuit for measuring the performance of the CDR circuit 153. For example, the BIST circuit 320 may measure the performance of the CDR circuit 153 while changing the phase of a clock input to the transmission circuit 140. The BIST circuit 320 may include a delay controller 330 and a CDR performance monitoring circuit 340.

The CDR performance monitoring circuit 340 may evaluate the recovery performance of the CDR circuit 153. For example, the CDR performance monitoring circuit 340 may receive a digital code value from the CDR circuit 153. Referring to FIG. 2, in the case of the CDR circuit 153 including the phase interpolator 250, the CDR performance monitoring circuit 340 may receive a PI code from the CDR circuit 153. The CDR performance monitoring circuit 340 may evaluate the performance of the CDR circuit 153 based on the received digital code value. For example, the CDR performance monitoring circuit 340 may evaluate the performance of the CDR circuit 153 according to the magnitude of a jitter included in the recovery clock output from the CDR circuit 153. According to one or more embodiments, the digital code output from the CDR circuit 153 may be locked at a first code value in response to data input to the first phase. Thereafter, the digital code may dither (e.g., increased or decreased) within an error range while maintaining the first code value. For example, the CDR performance monitoring circuit 340 may determine that the performance of the CDR circuit 153 for the first phase is acceptable or unacceptable according to the magnitude of jitter included in the recovery clock output from the CDR circuit 153 after locking. For example, when the magnitude of the jitter included in the recovery clock is within a predetermined threshold, the performance of the CDR circuit 13 may be determined to be acceptable. The CDR performance monitoring circuit 340 may transmit a control signal CTRL to the delay controller 330 when the digital code input from the CDR circuit 153 is locked and the magnitude of jitter is identified.

The delay controller 330 may delay the phase of the clock provided to the transmission circuit 140 in response to receiving the control signal CTRL from the CDR performance monitoring circuit 340. For example, the delay controller 330 may delay the phase of the reference clock REF_CLK received from the clock generation circuit 310 by a preset value in response to receiving the control signal CTRL to generate the delay clock DLY_CLK and may provide the generated delay clock DLY_CLK to the serializer 141. According to one or more embodiments, the delay controller 330 may be implemented with any circuit configured to change the phase. For example, the delay controller 330 may be any one of a phase interpolator, a DLL, and a voltage controlled delay line (VCDL). When the delay clock DLY_CLK is input to the serializer 141, the digital code of the CDR circuit 153 may be locked in a new code. For example, the digital code output from the CDR circuit 153 may be locked at a first code value in response to data input to the first phase. The delay controller 330 may provide the delay clock DLY_CLK of the second phase to the serializer 141. After a certain time elapses (e.g., the transient response time), the digital code may be locked at a second code value in response to data input to the second phase. When the digital code is locked at the second code value, the CDR performance monitoring circuit 340 may measure the amount of dithering at the second code value and provide the control signal CTRL to the delay controller 330 again to repeatedly provide the serializer 141 with a delay clock DLY_CLK of the third phase that is delayed from the second phase.

In the embodiment described above, the delay controller 330 is illustrated as being included inside the BIST circuit 320. However, as understood by one of ordinary skill in the art, the embodiments are not limited to these configurations. According to various embodiments, the delay controller 330 may be included in the transmission circuit 140. When the delay controller 330 is included in the transmission circuit 140, the delay controller 330 may receive the reference clock REF_CLK from the clock generator circuit 310 and provide the delay clock DLY_CLK to the serializer 141.

According to various embodiments, the delay controller 330 may be included in the clock generation circuit 310.

Figure 4:
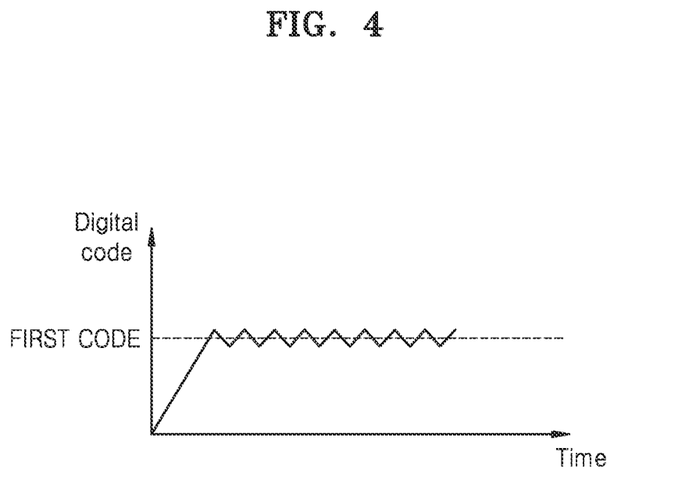
FIG. 4 is a graph showing digital codes according to a comparative example according to one or more embodiments.

FIG. 4 is a graph showing digital codes according to one or more embodiments.

Referring to FIG. 4, the BIST circuit 320 may not include the delay controller 330. For example, the BIST circuit 320 includes only the CDR performance monitoring circuit 340 and may measure the performance of the CDR circuit 153 by receiving the digital code output from the CDR circuit 153 and measuring the amount of dithering.

The clock generation circuit 310 may provide the reference clock REF_CLK to the transmission circuit 140. For example, the clock generation circuit 310 may provide the serializer 141 of the transmission circuit 140 with the reference clock REF_CLK having the first phase. The serializer 141 may serialize data, amplify burst data through the driver 142 according to the reference clock REF_CLK, and/or provide amplified data to the reception circuit 150. For example, the amplified data may be provided through loopback path (LB path). The CDR circuit 153 may generate a digital code by receiving the reference clock REF_CLK from the clock generation circuit 310 and input data Din from the CTLE 152. The digital code may be a code for controlling the phase interpolator 250 inside the CDR circuit 153. The digital code may dither (e.g., lock) at an arbitrary code value when the clock of the input data $D_{in}$ is recovered after the transient response period.

According to one or more embodiments, the phase of the clock (e.g., the reference clock REF_CLK) input to the serializer 141 may be in a state of always being fixed. Furthermore, the starting point where the data and the reference clock REF_CLK are transmitted may be the serializer 141 and the ending point is always the CDR circuit 153. Therefore, in one or more examples, the phase of the clock recovered by the CDR circuit 153 may be advantageously fixed except for fluctuating within the error range. Furthermore, the same may be applied to a digital code (e.g., PI code) for the CDR circuit 153 to control the phase interpolator 250 therein.

Referring to the graph of FIG. 4, the X axis may represent time and the Y axis may represent digital code values. For example, the Y-axis digital code may be a digital code input to the phase interpolator 250 included in the CDR circuit 153 of FIG. 2. When the phase of the reference clock REF_CLK is fixed to the first phase, the digital code may dither at the first code FIRST CODE after the transient response period. For example, the BIST circuit 320 according to the comparative example may only evaluate the clock recovery performance when the first code FIRST CODE is based on the reference clock REF_CLK of the first phase, and when the phase of the reference clock REF_CLK is changed and the digital code is changed, there is a difficulty in that the performance of the CDR circuit 153 cannot be practically evaluated. Although FIG. 4 illustrates the digital code dithering at a constant rate, as understood by one of ordinary skill in the art, the dithering may occur sporadically or randomly.

Figure 5:
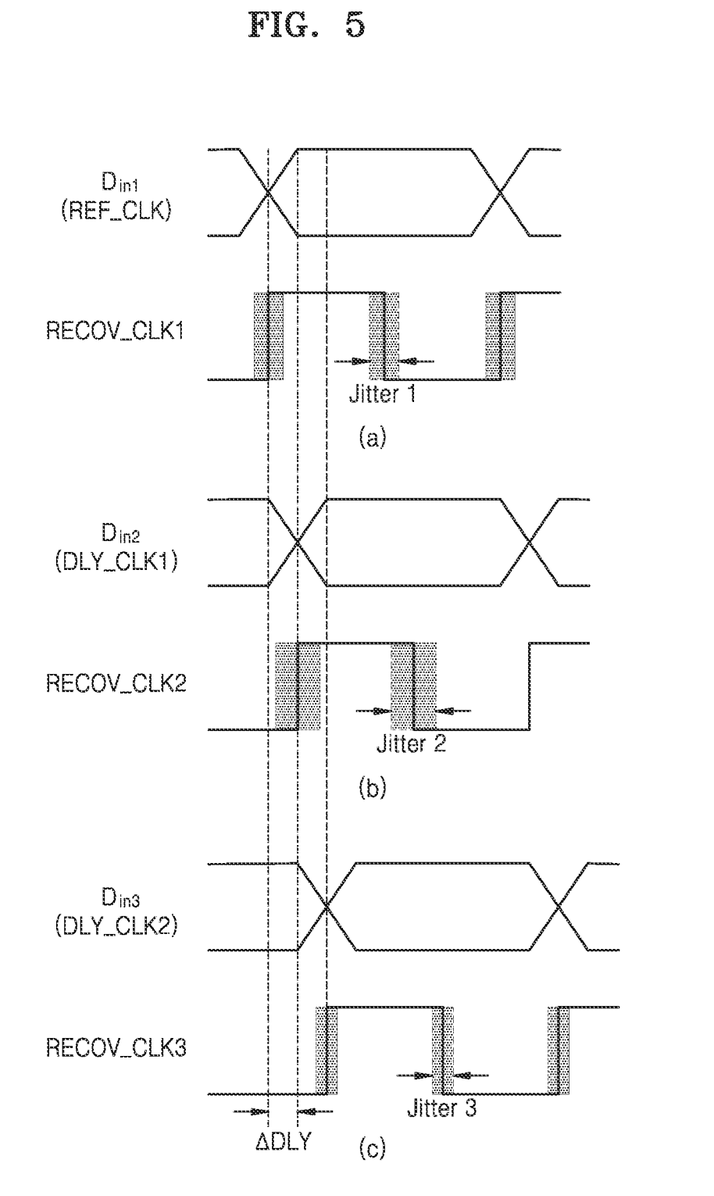
FIG. 5 illustrates a relationship between input data and a recovery clock of a CDR circuit according to one or more embodiments.
Figure 6:
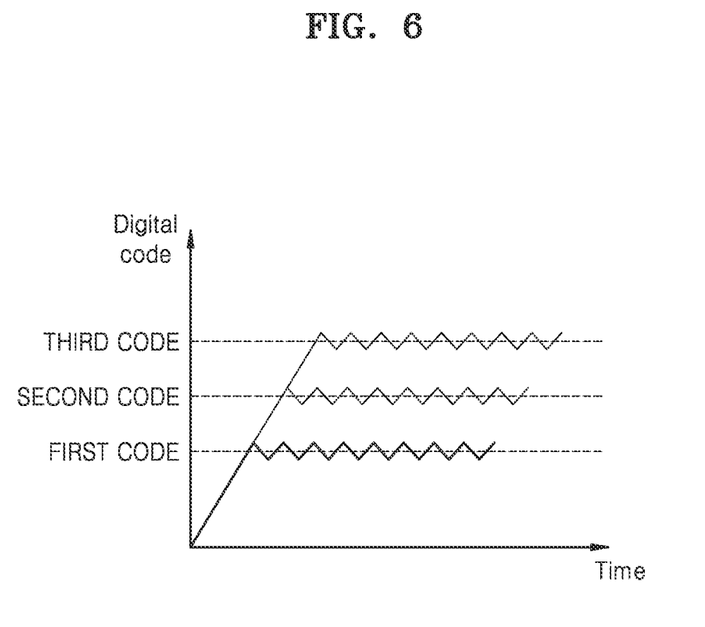
FIG. 6 is a graph illustrating a plurality of digital codes according to one or more embodiments.

FIG. 5 illustrates a relationship between input data and a recovery clock of the CDR circuit 153 according to one or more embodiments, and FIG. 6 is a graph showing a plurality of digital codes according to one or more embodiments.

Referring to example (a) of FIG. 5, the CDR circuit 153 may receive first input data $D_{in1}$ and output a first recovery clock RECOV_CLK1. The first recovery clock RECOV_CLK1 may include first jitter Jitter 1. For example, referring to FIG. 6, the digital code of the CDR circuit 153 may be locked at the first code FIRST CODE corresponding to the reference clock REF_CLK having the first phase. After being locked to the first code FIRST CODE, the digital code corresponding to the reference clock REF_CLK may dither within an error range. Since the digital code may dither, the first recovery clock RECOV_CLK1 may also include first jitter Jitter 1. As the performance of the CDR circuit 153 improves, the magnitude of the first jitter Jitter 1 may be reduced.

Referring to example (b) of FIG. 5, the CDR circuit 153 may receive second input data $D_{in2}$ and output a second recovery clock RECOV_CLK2. The second input data $D_{in2}$ may follow the first input data $D_{in1}$ by a preset delay value ΔDLY. Accordingly, the second recovery clock RECOV_CLK2, which is a clock recovered based on the second input data $D_{in2}$, may lag behind the first recovery clock RECOV_CLK1 by the preset delay value ΔDLY. The CDR performance monitoring circuit 340 of the BIST circuit 320 may measure the magnitude of the first jitter Jitter 1 after the digital code is locked to the first code FIRST CODE in example (a) of FIG. 5. After the measurement is completed, the CDR performance monitoring circuit 340 may provide a control signal CTRL to the delay controller 330 to delay the phase of the reference clock REF_CLK. The delay controller 330 may receive the control signal CTRL and provide a first delay clock DLY_CLK1, which is delayed by one delay value ΔDLY from the reference clock REF_CLK, to the serializer 141. The first delay clock DLY_CLK1 may be the same as the reference clock REF_CLK having a second phase.

Referring to FIG. 6 together, the CDR circuit 153 may output a digital code locked in the second code SECOND CODE corresponding to the reference clock REF_CLK or the first delay clock DLY_CLK1 having a second phase. The digital code may dither after being locked in the second code SECOND CODE.

Referring to example (b) of FIG. 5, the second recovery clock RECOV_CLK2 includes second jitter Jitter 2, and the magnitude of the second jitter Jitter 2 may be greater than that of the first jitter Jitter 1. For example, the performance of the CDR circuit 153 for recovering the reference clock REF_CLK having the second phase may be inferior to the performance of the CDR circuit 153 recovering the reference clock REF_CLK having the first phase.

Referring to example (c) of FIG. 5, the CDR circuit 153 may receive third input data Din3 and output a third recovery clock RECOV_CLK3. The third input data Din3 may follow the second input data $D_{in2}$ by a preset delay value ΔDLY. The third input data Din3 may follow the second input data $D_{in2}$ by a delay value ΔDLY. Accordingly, the third recovery clock RECOV_CLK3, which is a clock recovered based on the third input data Din3, may follow the second recovery clock RECOV_CLK2. The CDR performance monitoring circuit 340 of the BIST circuit 320 may measure the magnitude of the second jitter Jitter 2 after the digital code is locked with the second code SECOND CODE in (b) of FIG. 5. After the measurement is completed, the CDR performance monitoring circuit 340 may provide a control signal CTRL to the delay controller 330 to delay the phase of the first delay clock DLY_CLK1 again. The delay controller 330 may receive the control signal CTRL and provide the serializer 141 with a second delay clock DLY_CLK2 of which a phase is delayed by one delay value ΔDLY from the first delay clock DLY_CLK1. The second delay clock DLY_CLK2 may be the same as the reference clock REF_CLK having a third phase. The difference between the first phase and the second phase and the difference between the second phase and the third phase may be equal to each other.

The CDR circuit 153 may output a digital code locked in the third code THIRD CODE corresponding to the reference clock REF_CLK or the second delay clock DLY_CLK2 having a third phase. The digital code may dither after being locked in the third code THIRD CODE.

Referring to example (c) of FIG. 5, the third recovery clock RECOV_CLK3 includes third jitter Jitter 3, and the magnitude of the third jitter Jitter 3 may be less than that of the first jitter Jitter 1. For example, the performance of the CDR circuit 153 for recovering the reference clock REF_CLK having the third phase may be superior to the performance of the CDR circuit 153 recovering the reference clock REF_CLK having the first phase.

Figure 7:
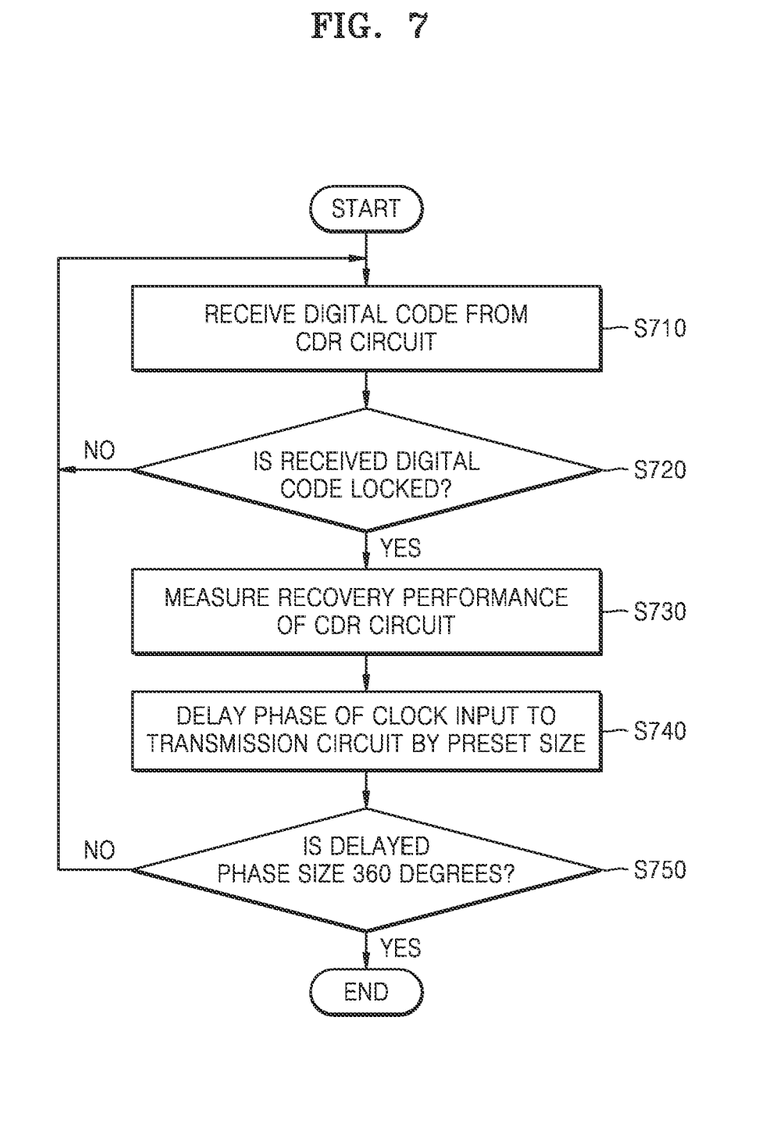
FIG. 7 is a flowchart illustrating a method of operating a built-in self-test (BIST) circuit, according to one or more embodiments.

FIG. 7 is a flowchart illustrating a method of operating the BIST circuit 320, according to one or more embodiments.

Referring to FIG. 7, in operation S710, the BIST circuit 320 may receive a digital code from the CDR circuit 153. For example, the CDR performance monitoring circuit 340 of the BIST circuit 320 may receive the digital code. In the case of the CDR circuit 200 including the phase interpolator 250, the digital code may be a PI code.

In operation S720, the BIST circuit 320 may determine whether the received digital code is locked. When the CDR performance monitoring circuit 340 detects that the received digital code varies within a certain range, it may be determined that the digital code is locked. For example, referring to FIG. 6, the CDR performance monitoring circuit 340 may identify that the received digital code fluctuates up and down by a certain amount around the first code FIRST CODE. The CDR performance monitoring circuit 340 may determine that the digital code is locked when it is identified that the digital code is dithering within a certain amount around the first code FIRST CODE.

In the embodiment described above, it has been described that the BIST circuit 320 monitors the received digital code to determine whether or not to lock but is not limited thereto. According to various embodiments, the BIST circuit 320 may receive the digital code and activate the timer from the reception time point. The timer may be used for checking the lapse of a predefined time. For example, the predefined time may be a sufficiently long time until the digital code is locked. For example, the BIST circuit 320 may determine that the digital code is locked when a preset time elapses based on the timer without monitoring the digital code after receiving the digital code.

In operation S730, the BIST circuit 320 may measure the recovery performance of the CDR circuit 153. The measured recovery performance may be performance limited to the phase of input data provided to the CDR circuit 153. For example, the ability of the CDR circuit 153 to recover input data according to the first phase and the performance to recover input data according to the second phase may be different from each other.

The BIST circuit 320 may apply a sinusoidal jitter to the input data and measure a bit error rate by comparing recovery data recovered from the CDR circuit 153 based on the input data and the jitter of the sine wave and the input data. The BIST circuit 320 may monitor a bit error rate while gradually increasing the magnitude of jitter of the sine wave included in the input data. The BIST circuit 320 may identify the magnitude of jitter of the sine wave applied at a time point at which the monitored bit error rate exceeds a preset threshold error rate and determine the identified size as recovery performance of the CDR circuit 153 corresponding to the input data. For example, as the identified size increases, the BIST circuit 320 may determine that the CDR circuit 153 has better recovery performance (or jitter tracking capability) for the input data. As described below, the magnitude of jitter at the time point at which the bit error rate of the CDR circuit 153 reaches the critical error rate, for example, the recovery performance of the CDR circuit 153, may be different depending on input data of different phases.

The CDR performance monitoring circuit 340 of the BIST circuit 320 may measure recovery performance based on the recovery clock RECOV_CLK output by the CDR circuit 153. For example, referring to example (a) of FIG. 5, the CDR circuit 153 may recover the first input data Din1 input as the reference clock REF_CLK and output the first recovery clock RECOV_CLK1. The first recovery clock RECOV_CLK1 may include first jitter Jitter 1. The CDR performance monitoring circuit 340 may evaluate recovery performance with respect to the reference clock REF_CLK by measuring the magnitude of the first jitter Jitter 1. In one or more examples, referring to example (b) of FIG. 5, the CDR circuit 153 may recover the second input data $D_{in2}$ input to the first delay clock DLY_CLK1 to output a second recovery clock RECOV_CLK2. The second recovery clock RECOV_CLK2 may include second jitter Jitter 2. The CDR performance monitoring circuit 340 may evaluate the recovery performance for the first delay clock DLY_CLK1 by measuring the magnitude of the second jitter Jitter 2. Referring to examples (a) and (b) of FIG. 5, the magnitude of the second jitter Jitter 2 may be greater than that of the first jitter Jitter 1. The CDR performance monitoring circuit 340 may identify that the recovery performance of the first delay clock DLY_CLK1 is lower than the recovery performance of the reference clock REF_CLK. In one or more examples, referring to example (c) of FIG. 5 together, the CDR circuit 153 may recover the third input data Din3 input to the second delay clock DLY_CLK2 to output the third recovery clock RECOV_CLK3. The third recovery clock RECOV_CLK3 may include third jitter Jitter 3. The CDR performance monitoring circuit 340 may measure the magnitude of the third jitter Jitter 3 to evaluate the recovery performance for the second delay clock DLY_CLK2. Referring to examples (a) and (c) of FIG. 5, the magnitude of the third jitter Jitter 3 may be less than the magnitude of the first jitter Jitter 1. The CDR performance monitoring circuit 340 may identify that the recovery performance of the second delay clock DLY_CLK2 is superior to that of the reference clock REF_CLK.

In operation S740, the BIST circuit 320 may delay the phase of the clock input to the transmission circuit 140 by a predetermined amount. Since the recovery performance of the CDR circuit 153 with respect to the current phase was evaluated in operation S730, the phase of the clock input to the transmission circuit 140 may be delayed to evaluate the performance of the CDR circuit 153 with respect to a phase delayed by the predetermined amount.

In operation S750, it may be determined that the delayed phase size is 360 degrees. If the delayed phase size is 360 degrees, the procedure can be terminated because the evaluation of the performance of the CDR circuit 153 for all phases may have been completed. If the delayed phase size has not reached 360 degrees, operation S710 through operation S730 can be repeated to evaluate the performance of the CDR circuit 153 for phases delayed by a predetermined amount.

Figure 8:
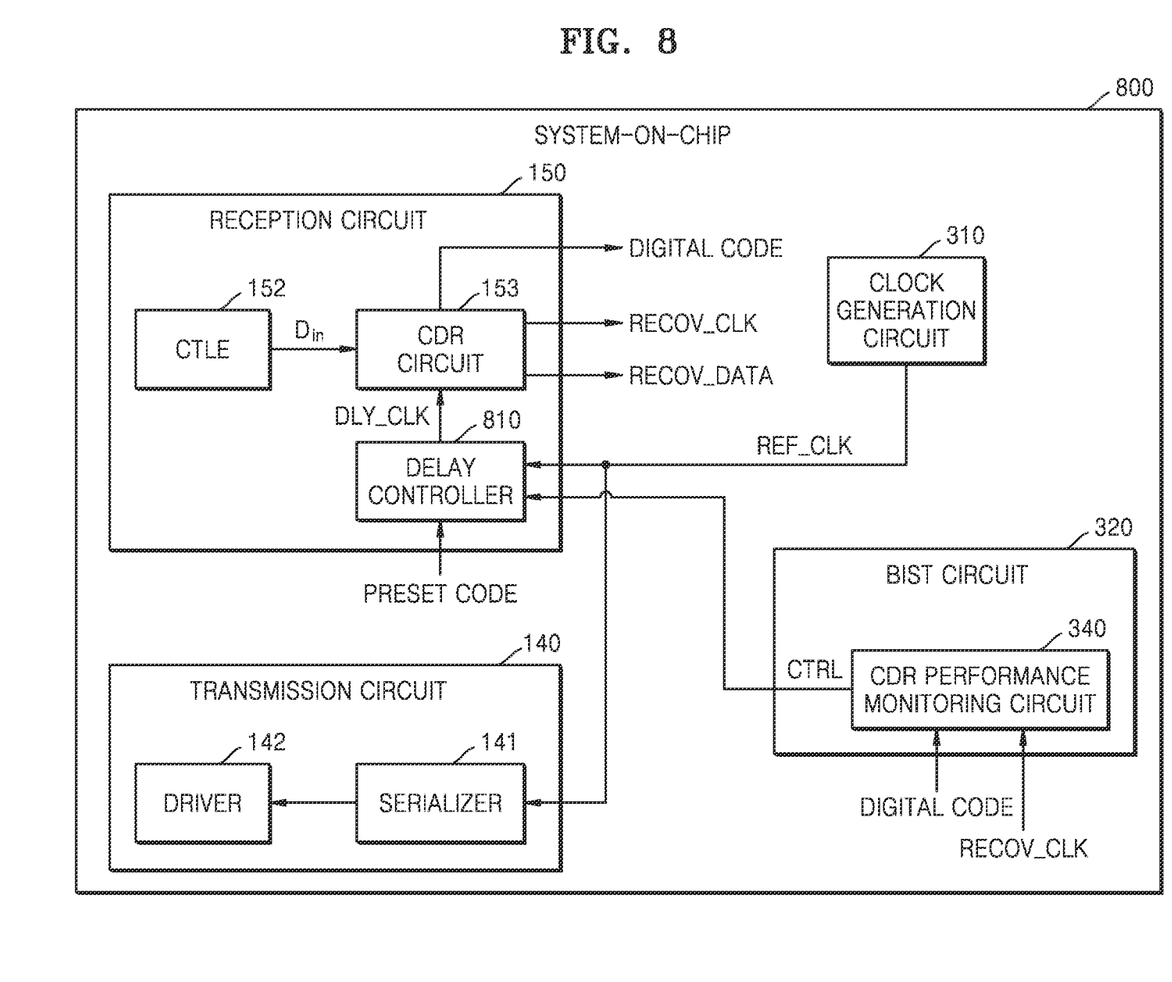
FIG. 8 is a block diagram of a system-on-chip according to one or more embodiments.

FIG. 8 is a block diagram of a system-on-chip according to one or more embodiments.

Referring to FIG. 8, a system-on-chip 800 may include a delay controller 810. The delay controller 810 may be included in the reception circuit 150. For example, the delay controller 810 may receive the reference clock REF_CLK from the clock generation circuit 310 and receive the control signal CTRL from the CDR performance monitoring circuit 340, respectively.

According to one or more embodiments, the delay controller 810 may receive the reference clock REF_CLK and may not receive the control signal CTRL. Since the control signal CTRL is not received, the delay controller 810 may transfer the reference clock REF_CLK to the CDR circuit 153 without modification. The delay controller 810 may delay the phase of the reference clock REF_CLK and provide the delay clock DLY_CLK to the CDR circuit 153 in response to receiving the control signal CTRL.

According to various embodiments, the system-on-chip 800 may evaluate the performance of the CDR circuit 153 for a plurality of digital codes, similar to the system-on-chip 300 of FIG. 3. For example, the system-on-chip 300 of FIG. 3 changes the phase of the clock input to the serializer 141 of the transmission circuit 140 whenever the digital code is locked and measures performance of the CDR circuit 153 for a plurality of digital codes. The system-on-chip 800 of FIG. 8 may provide the delay clock DLY_CLK instead of the reference clock REF_CLK to the CDR circuit 153 of the reception circuit 150 whenever the digital code is locked such that the digital code that is locked may be changed. As understood by one of ordinary skill in the art, when the phase of the clock signal input to the CDR circuit 153 is changed, the digital code output from the CDR circuit 153 is also changed.

According to various embodiments, the delay controller 810 may receive a preset code. The preset codes may represent digital code values that significantly degrade the performance of the CDR circuit 153. For example, referring to FIGS. 5 and 6, when the first delay clock DLY_CLK is input to the CDR circuit 153, the preset code may be a digital code with a large amount of jitter, such as the second recovery clock RECOV_CLK2. The delay controller 810 may receive and store the preset code in advance. When the system-on-chip 800 receives arbitrary input data while communicating with another chip, a digital code output by the CDR circuit 153 may be the same as the preset code. When the digital code output from the CDR circuit 153 is the same as the preset code, the delay controller 810 may predict that the recovery clock RECOV_CLK may contain a large amount of jitter, and accordingly, the phase of the clock input to the CDR circuit 153 may be delayed through the delay controller 810. For example, when the phase of the clock input to the CDR circuit 153 is delayed, the digital code locked in the CDR circuit 153 may be changed, and accordingly, jitter of the recovery clock RECOV_CLK output from the CDR circuit 153 may be advantageously reduced.

Figure 9:
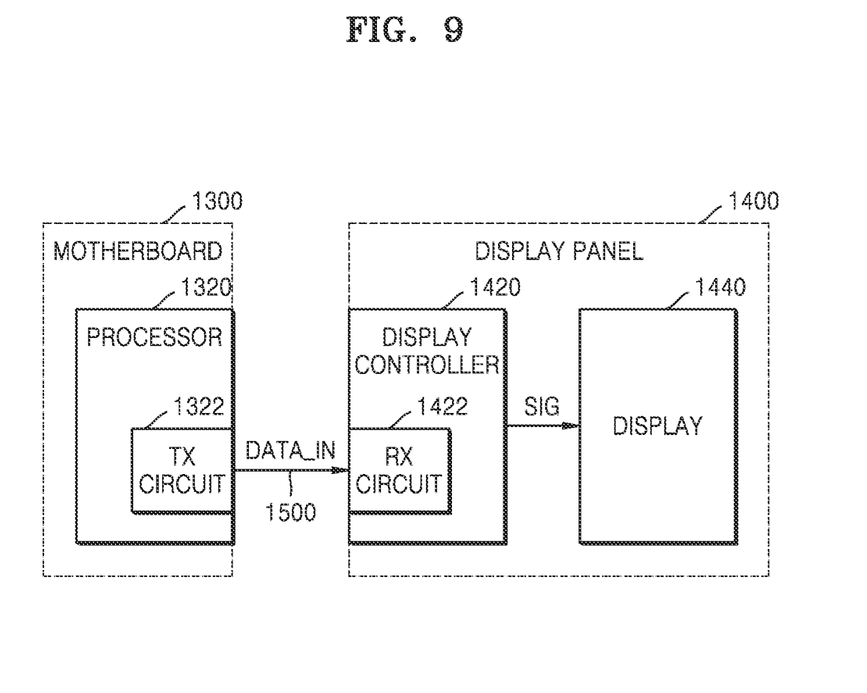
FIG. 9 is a block diagram illustrating a device including a CDR circuit according to one or more embodiments.

FIG. 9 is a block diagram illustrating a device including a CDR circuit according to one or more embodiments.

A CDR circuit according to one or more embodiments may be included in a reception circuit 1422. The device may be a computing system including a display panel 1400 and as a non-limiting example, may be a stationary system, such as a desktop computer, server, TV, electronic signboard, and the like, and may also be a mobile system, such as a laptop computer, mobile phone, tablet personal computer (PC), wearable device, or any other suitable device known to one of ordinary skill in the art. As shown in FIG. 9, the device may include a motherboard 1300 and a display panel 1400, and input data D_IN may be transferred from the motherboard 1300 to the display panel 1400 through a data line 1500.

The motherboard 1300 may include a processor 1320, and the processor 1320 may include a transmission circuit 1322. The processor 1320 may refer to a processing unit that performs computational operations, such as a microprocessor, a microcontroller, an application specific integrated circuit (ASIC), or a field programmable gate array (FPGA). In some embodiments, the processor 1320 may be a video graphics processor, such as a graphics processing unit (GPU). The processor 1320 may generate image data corresponding to an image output through the display 1440 included in the display panel 1400, and the image data may be provided to the transmission circuit 1322.

The transmission circuit 1322 may output input data D_IN to the reception circuit 1422 for a clock data recovery operation of the reception circuit 1422. The display panel 1400 may include a display controller 1420 and the display 1440. The display controller 1420 may receive input data D_IN from the motherboard 1300 and may perform a clock data recovery operation using the input data D_IN. In some embodiments, the display controller 1420 may provide a display signal SIG for controlling pixels included in the display 1440 and may be referred to as a display driver IC (DDIC).

The display controller 1420 may include a reception circuit 1422, and the reception circuit 1422 may receive input data D_IN. The reception circuit 1422 may include a CDR circuit according to example embodiments and may generate recovery clocks and recovery data from input data D_IN. The CDR circuit included in the reception circuit 1422 may include a digital loop filter to minimize the phase difference between the recovery clock and input data.

The display 1440 may include any type of display known to one of ordinary skill in the art, such as a liquid crystal display (LCD), a light emitting diode (LED) display, an electroluminescent display (ELD), a cathode ray tube (CRT) display, a plasma display panel (PDP) display, and a liquid crystal on silicon (LCoS) display as non-limiting examples. Furthermore, although the device is illustrated as including one display panel 1400 in FIG. 9, in some embodiments, the device may include two or more display panels, for example, two or more displays.

Figure 10:
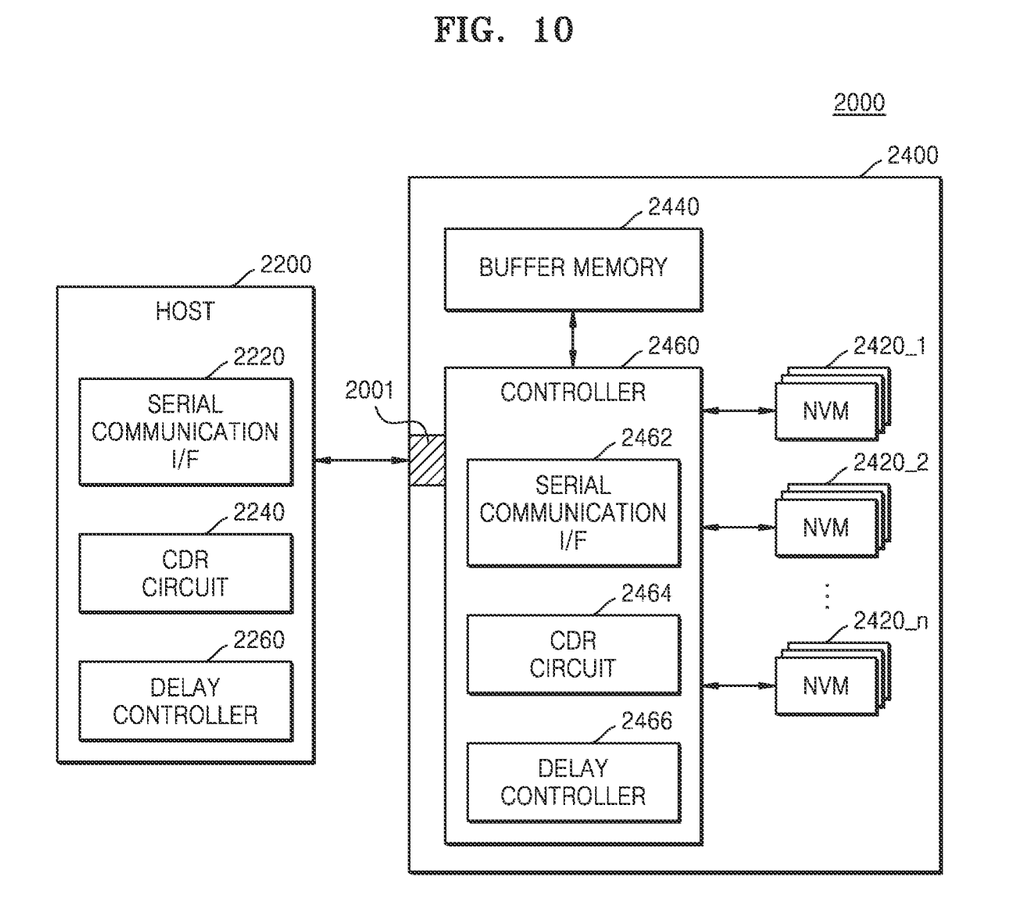
FIG. 10 is a block diagram illustrating a system according to one or more embodiments.

FIG. 10 is a block diagram illustrating a system 2000 according to one or more embodiments.

Referring to FIG. 10, the system 2000 may include a host 2200 and a memory device 2400. The storage device 2400 may be referred to as a memory system or a storage system and may include a signal connector 2001, a plurality of nonvolatile memories 2420_1 to 2420_n, a buffer memory 2440, and a controller 2460. For example, the controller 2460 may be referred to as a memory controller or a storage controller.

The storage device 2400 may transmit and receive signals to and from the host device 2200 through the signal connector 2001. The host 2200 and the storage device 2400 may communicate with each other through electrical signals and/or optical signals and as a non-limiting example, may communicate with each other through protocols such as Universal Flash Storage (UFS), Serial Advanced Technology Attachment (SATA), SATA express (SATAe), Small Computer Small Interface (SCSI), Serial Attached SCSI (SAS), Peripheral Component Interconnect express (PCIe), Non-Volatile Memory Express (NVMe), Advanced Host Controller Interface (AHCI), or a combination thereof.

The controller 2460 may control the plurality of nonvolatile memories 2420_1 to 2420_n in response to a signal received from the host 2200. The controller 2460 may include a serial communication interface circuit 2462 for transmitting and receiving data and may include a CDR circuit 2464 and a delay controller 2466 to which embodiments are applied to recover the clock and data of the received serial data signal. The serial communication interface circuit 2462 may provide a communication interface, such as UFS, SATA, SATAe, SCSI, SAS, PCIe, NVMe, AHCI, or any other suitable communication interfaces known to one of ordinary skill in the art. The buffer memory 2440 may operate as a buffer memory of the storage device 2400. Furthermore, the host 2200 may also include a serial communication interface circuit 2220 for transmitting and receiving data, and a CDR circuit 2240 and a delay controller 2260 to which embodiments are applied.

Each of the non-volatile memories 2420_1 to 2420_n may include a memory cell array. The memory cell array may include memory blocks. Each of the memory blocks may be divided into pages. Each page may include non-volatile memory cells, for example, at least one NAND flash memory cell.

The above embodiments are described and illustrated in terms of blocks, as shown in the drawings, which carry out a described function or functions. Some of these blocks, which may be referred to herein as units or modules or the like, or by names such as device, logic, circuit, counter, comparator, generator, converter, or the like may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

While the embodiments have been particularly shown and described with reference to embodiments thereof, it will be understood that various changes in form and details may be made therein without departing from the spirit and scope of the following claims.

What is claimed is:

1. A system-on-chip comprising:
a clock generation circuit configured to generate a reference clock of a first phase;
a transmission circuit comprising a serializer configured to serialize data according to the reference clock of the first phase;
a reception circuit comprising a clock data recovery (CDR) circuit configured to receive the serialized data and generate a first recovery clock and recovery data; and
a Built In Self Test (BIST) circuit comprising:
a CDR performance monitoring circuit configured to generate a control signal provided to a delay controller configured to delay a clock signal by a preset phase difference, wherein the CDR performance monitoring circuit is configured to receive a digital code from the CDR circuit and provide the control signal to the delay controller in response to a detection that the digital code is locked with a first code, and
the delay controller configured to delay the clock signal in response to the control signal by the preset phase difference and provide the delayed clock signal to the transmission circuit.

2. The system-on-chip of claim 1,
wherein the digital code is a Phase Interpolation (PI) code configured to control a phase interpolator inside the CDR circuit in order for the CDR circuit to generate the first recovery clock based on data serialized through the serializer and the reference clock.

3. The system-on-chip of claim 2, wherein the CDR performance monitoring circuit is configured to measure a recovery performance for the reference clock of the first phase based on a magnitude of a first jitter included in the first recovery clock.

4. The system-on-chip of claim 3, wherein the delay controller is configured to provide a reference clock of a second phase lagging the first phase to the serializer in response to the control signal, and
wherein the CDR circuit is configured to receive serialized data from the serializer according to the reference clock of the second phase and generate a digital code locked in a second code, a second recovery clock, and recovery data, wherein the second code is different from the first code,
wherein the second recovery clock lags behind the first recovery clock by the preset phase difference.

5. The system-on-chip of claim 4, wherein the CDR performance monitoring circuit is configured to measure a recovery performance for the reference clock of the second phase based on a magnitude of a second jitter included in the second recovery clock.

6. The system-on-chip of claim 5, wherein, based on a magnitude of the first jitter being less than a magnitude of the second jitter, the recovery performance for the reference clock of the second phase is lower than the recovery performance for the reference clock of the first phase,
wherein, based on a magnitude of the first jitter being greater than a magnitude of the second jitter, the recovery performance for the reference clock of the second phase is higher than the recovery performance for the reference clock of the first phase.

7. The system-on-chip of claim 1, wherein the transmission circuit further comprises a driver configured to amplify serialized data from the serializer,
wherein the reception circuit further comprises a continuous time linear equalizer (CTLE) configured to remove inter-symbol interference of a signal received from the driver and provide a result of the removal to the CDR circuit.

8. The system-on-chip of claim 1, wherein the delay controller is one of a phase interpolator, a delay lock loop (DLL), or a voltage controlled delay line (VCDL).

9. A system-on-chip comprising:
a clock generation circuit configured to generate a first phase reference clock;
a transmission circuit comprising a serializer configured to serialize data according to a reference clock of a first phase;
a reception circuit comprising:
a delay controller configured to receive the reference clock of the first phase and delay the received reference clock by a preset phase difference to generate a delay clock, and
a Clock Data Recovery (CDR) circuit configured to receive the serialized data and generate a first recovery clock and recovery data; and
a Built In Self Test (BIST) circuit comprising a CDR performance monitoring circuit configured to generate a control signal instructing generation of the delay clock and provide the control signal to the delay controller, wherein the CDR performance monitoring circuit is configured to receive a digital code from the CDR circuit and provide the control signal to the delay controller in response to a detection that the digital code is locked with a first code.

10. The system-on-chip of claim 9, wherein the CDR performance monitoring circuit is configured to receive a digital code from the CDR circuit and provide the control signal to the delay controller in response to a detection that the digital code is locked with a first code,
wherein the digital code is a Phase Interpolation (PI) code configured to control a phase interpolator inside the CDR circuit in order for the CDR circuit to generate the first recovery clock based on data serialized through the serializer and the reference clock.

11. The system-on-chip of claim 10, wherein the CDR performance monitoring circuit is configured to measure a recovery performance for the reference clock of the first phase based on a magnitude of a first jitter included in the first recovery clock.

12. The system-on-chip of claim 11, wherein the delay controller is configured to provide a reference clock of a second phase lagging more than the first phase to the CDR circuit in response to the control signal,
wherein the CDR circuit is configured to generate a digital code locked in a second code that is different from the first code, a second recovery clock, and recovery data based on the serialized data and the reference clock of the second phase,
wherein the second recovery clock is lagging by the preset phase difference from the first recovery clock.

13. The system-on-chip of claim 12, wherein the CDR performance monitoring circuit is configured to measure a recovery performance for the reference clock of the second phase based on a magnitude of second jitter included in the second recovery clock.

14. The system-on-chip of claim 13, wherein, based on a magnitude of the first jitter being less than a magnitude of the second jitter, the recovery performance for the reference clock of the second phase is lower than the recovery performance for the reference clock of the first phase,
wherein, based on the magnitude of the first jitter being greater than the magnitude of the second jitter, the recovery performance for the reference clock of the second phase is higher than the recovery performance for the reference clock of the first phase.

15. The system-on-chip of claim 14, wherein the delay controller is configured to receive and store preset codes corresponding to digital codes representing recovery performance below a threshold performance,
wherein the CDR performance monitoring circuit is configured to provide the control signal to the delay controller based on the digital code received from the CDR circuit matching a preset code among the preset codes.

16. The system-on-chip of claim 9, wherein the transmission circuit further comprises a driver configured to amplify serialized data from the serializer,
wherein the reception circuit further comprises a continuous time linear equalizer (CTLE) configured to remove inter-symbol interference of a signal received from the driver and provide a result of the removal to the CDR circuit.

17. An operating method of a Built In Self Test (BIST) circuit comprises a delay controller for phase delay of a clock and a clock data recovery (CDR) performance monitoring circuit, the method comprising:
receiving a digital code from a CDR circuit outputting a recovery clock and recovery data based on input data;
determining whether the received digital code is locked; and
delaying a phase of the input data by a predefined phase difference by providing a control signal instructing a phase delay to the delay controller in response to the determination that the digital code is locked.

18. The method of claim 17, further comprising, based on the determination the digital code is locked, measuring the CDR performance of the CDR circuit based on a magnitude of a jitter included in the recovery clock.

19. The method of claim 17, further comprising, based on the determination the digital code is locked, measuring the CDR performance of the CDR circuit based on a dithering magnitude of the locked digital code.

20. The method of claim 17, wherein the delay controller is one of a phase interpolator, a delay lock loop (DLL), and a voltage controlled delay line (VCDL).

* * * * *